United States Patent
Bull et al.

(10) Patent No.: US 8,634,944 B2
(45) Date of Patent: Jan. 21, 2014

(54) AUTO-STATION TUNING

(75) Inventors: William Bull, Mountain View, CA (US); Ben Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1258 days.

(21) Appl. No.: 12/207,301

(22) Filed: Sep. 9, 2008

(65) Prior Publication Data

US 2010/0010648 A1     Jan. 14, 2010

Related U.S. Application Data

(60) Provisional application No. 61/079,573, filed on Jul. 10, 2008.

(51) Int. Cl.
*G06F 17/00* (2006.01)
*G06F 3/00* (2006.01)
*G06F 13/00* (2006.01)
*H04N 5/445* (2011.01)

(52) U.S. Cl.
USPC ............... 700/94; 340/4.37; 725/46; 725/61

(58) Field of Classification Search
USPC .............. 340/437, 4.4; 700/94; 709/202, 203, 709/230, 231; 715/716, 727; 725/9, 13, 14, 725/16, 60, 61, 86, 87, 46
See application file for complete search history.

(56) References Cited

U.S. PATENT DOCUMENTS

| | | | |
|---|---|---|---|
| 7,028,082 B1* | 4/2006 | Rosenberg et al. | 709/223 |
| 2004/0143349 A1* | 7/2004 | Roberts et al. | 700/94 |
| 2008/0086747 A1* | 4/2008 | Rasanen et al. | 725/46 |
| 2009/0073318 A1* | 3/2009 | Shanks et al. | 348/564 |

* cited by examiner

*Primary Examiner* — Jesse Elbin
(74) *Attorney, Agent, or Firm* — Fish & Richardson P.C.

(57) ABSTRACT

In various embodiments, a media player or portable media device can enable a user to navigate and discover content or other media assets. The media player may analyze broadcasts and other content streams to determine currently playing and forthcoming content. The media player may switch from one source of content to another to find content that matches user preferences or criteria. The media player may generate playlists based on the matching content, and switch between sources of the matching content automatically. In some embodiments, the media player may receive user input to browse content using a navigation stream. Content associated with stations within the navigation stream may be output. As if the user were tuning a radio dial, the media player may determine what content to played back for each station. The media player may procure content and generate playlists to represent each station focus on by the user.

20 Claims, 12 Drawing Sheets

AUTO-STATION TUNING

CROSS-REFERENCES TO RELATED APPLICATIONS

This application claims priority to and the benefit of U.S. Provisional Application No. 61/079,573, filed Jul. 10, 2008 and entitled "Auto-Station Tuning," the entire disclosure of which is herein incorporated by reference for all purposes.

BACKGROUND OF THE INVENTION

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

Users listen to, watch, or otherwise receive and consume content in a variety of contexts. For example, it is common to listen to music while driving, riding public transit, exercising, hiking, doing chores, or the like. Additionally, users now are more often using media players to receive radio, television, and satellite broadcasts, Global Positioning and other broadcast-based location services for navigation and recreation in addition to the playback of content stored on the media players.

Media players can be configured to allow a user to browse content stored on the device. Typically, users browse and discover content using a media player by navigating through metadata or other information about the content, such as the filename, title, album information, or the like. Thus, user may focus on the metadata to procure the content in which user may be interest. Problems may arise when users attempt to navigate and procure content with media players that do not include a user interface capable of displaying the metadata to the user. Additionally, users engaged in various activities, such as driving or doing chores, may prefer not to focus significant attention to the media player to browse content.

Media players can also be configured to receive content or other media assets from a variety of sources. In the case of radio or other broadcasts, users may manually switch between various stations or frequencies to find songs or programs on those stations that the users like. Often, users might not readily know when the next song or television program is about to start. Thus, users simply may randomly explore different stations in an attempt to discover content that may be playing.

When users may know when the next song or program is to begin, the users may miss the beginning of the song or program, or the content altogether, unless the user is actively monitoring a content schedule and the time. It may become frustrating for users who desire to procure interesting content from a variety of sources due because the users may forget to constantly observe program scheduling and manually switch between sources.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to systems and methods for browsing and navigation content and other media assets.

In various embodiments, a user can interact with a media player or portable media device to browse or otherwise initiate playback of content or other media assets from a variety of sources that provide content within content streams. The user may define from which sources content should be selected and may also define content selection criteria that enables the media player to have finer control for selecting content from the sources. The media player may output or playback content or other media assets within the content streams that satisfy the criteria. The media player may switch from one source of content to another source of content based on the criteria to provide playback of the content or other media assets that the user desires.

A media player or portable media device may analyze information associated with content streams from multiple sources to determine currently playing or forthcoming content. The media player may automatically tune to one of the sources based on user preferences or criteria to output the currently playing content. The media player may tune to a source or switch from one source to another source based a user's tastes for music, a give volume level, an aversion to talk radio, or other user preferences or criteria. The media player may also queue or schedule forthcoming content on a given source for playback to the user. When the time comes for the content to be received from the given source, the media player may tune to or switch to the given source for the user.

In some embodiments, a media player or portable media device can tune to a particular source of content or switch between content streams based on the occurrence of an event. The occurrence of an event may include receiving information that a particular show is beginning, the ending of a program, the start of an advertisement, differentials between audio and/or visual levels, or the like. In further embodiments, criteria or user preferences can be received with which the media player may create an on-the-fly playlist. The playlist may include content potentially distributed by content streams from multiple sources that satisfies the user-defined criteria. Based on the playlist, the media player may automatically tune to sources or switch between content sources to provide to the user with uninterrupted content in which the user implicitly or explicitly expresses an interest.

In various embodiments, a media player or portable media device can enable a user to browse or otherwise initiate playback of content or other media assets using a navigation stream. The media player may procure from one or more sources content for playback to the user that satisfies criteria or matches attributes associated with the content that is the subject of the user's focus within the navigation stream. The content-focused browsing and navigation of content or other media assets can provide the user with a mechanism to more easily discover and playback content in which the user is interested. Additionally, based on where the user is at in the user interface and the content in focus, the media player may perform one or more actions.

A media player or portable media device may generate a navigation stream to include a set of stations to which the user can navigate, such as a user would tune to a radio station or frequency. In some embodiments, the navigation stream can include excerpts or clips of content to represent each station within the navigation stream. The media player may output or present the excerpts or clips representative of each station as the user navigates or tunes to each station within the navigation stream. The media player may allow the user to interact with the navigation stream using "tuning" motions (e.g., circular motions made by the user with user interface) as the user attempts to find the station that contains content in which the user may be interested.

Based on where the user is at in the user interface, the user may focus on a particular excerpt or clip within the navigation stream. For example, the media player may determine that a given station within the navigation stream is the subject of the user's focus when the user stops tuning motions and pauses on a particular excerpt or clip representing the given station. In response to this content-based focus, the media player may determine what actions may be performed or what content may be played back.

When user focuses on a station within the navigation stream, a media player or portable media device may synchronize playback of content or other media assets from which the excerpt or clip representing the station was taken. The media player may initiate playback of the remainder of the content from which the clip or excerpt was taken at the location in the content where the clip ends. The media player may also perform other functions, such as automatically building a playlist of content to represent the station. Thus, the media player may continue to output content to the user that satisfies criteria or otherwise matches attributes associated with the station within the navigation stream selected by the user.

A further understanding of the nature and the advantages of the inventions disclosed herein may be realized by reference to the remaining portions of the specification and the accompanying drawings.

BRIEF DESCRIPTION OF THE DRAWINGS

In order to better illustrate and describe examples and/or embodiments of those inventions found within the specification, reference may be made to the accompanying drawings. The additional details used to describe the accompanying drawings should not be considered as limitations to the scope of any of the disclosed inventions, the presently described examples and/or embodiments of the inventions, and/or the presently understood best mode of the inventions.

DETAILED DESCRIPTION OF THE INVENTION

In various embodiments, a user can interact with a media player or portable media device to browse or otherwise initiate playback of content or other media assets. The media player or portable media device may analyze information from content streams to determine currently playing or forthcoming content. The media player may selectively switch between currently playing content on different content streams. The media player may queue or schedule forthcoming content for playback to the user when the content is being playback on a content stream.

In some embodiments, a user can interact with a media player or portable media device to browse or otherwise initiate playback of content or other media assets using a navigation stream. The navigation stream may include a set of "stations" to which the user can navigate, such as a user would "tune" to a radio station or frequency. The navigation stream can provide a contextual mechanism by which content representing a station within the navigation stream provides a focus for the user's interaction with a user interface. Based on where the user is at in the user interface and the content in focus, the media player may perform one or more actions. The content-focused browsing and navigation of content or other media assets can provide the user with a mechanism to more easily discover and playback content in which the user is interested.

Aspects of the environments within which various examples and/or embodiments of those invention found within the specification operate will first be described.

Figure 1:
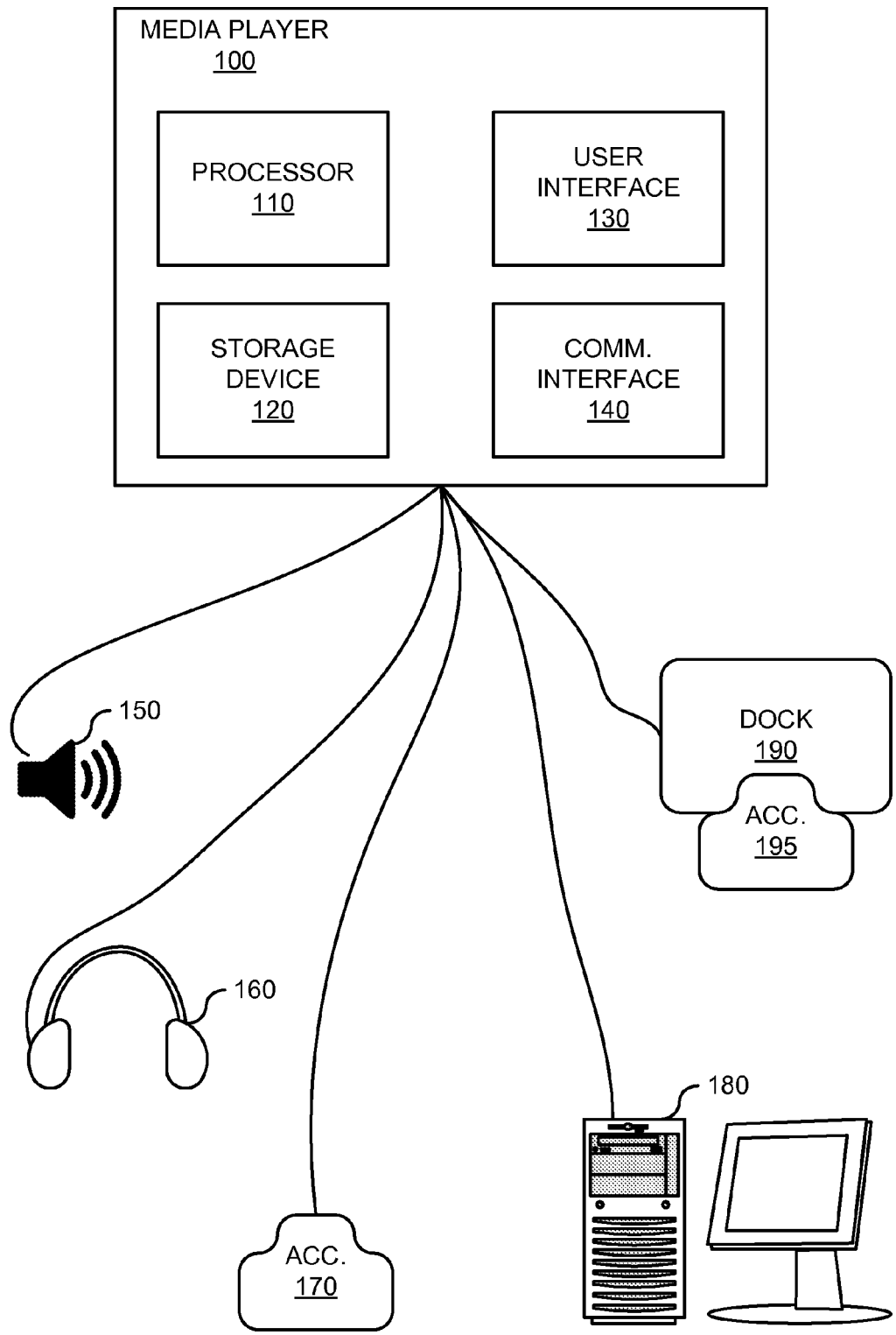
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed on the media player. One example of media player 100 can be the iPod® media player, which is available from Apple, Inc. of Cupertino, Calif. Another example of media player 100 can be a personal computer, such as a laptop or desktop.

In this example, media player 100 includes processor 110, storage device 120, user interface 130, and communications interface 140. Processor 110 can control various functionalities associated with media player 100. Media play 100 may output audio content, video content, image content, and the like. Media player 100 may also output metadata or other information associated with content, such as track information and album art.

Typically, a user may load or store content onto media player 100 using storage device 120. Storage device 120 can include read-only memory (ROM), random access memory (RAM), non-volatile memory, flash memory, floppy disk, hard disk, or the like. A user may interact with user interface 130 of media player 100 to view or consume content. Some examples of user interface 130 can include buttons, click wheels, touch pads, displays, touch screens, and other input/output devices.

Media player 100 can include one or more connectors or ports that can be used to load content, retrieve content, interact with applications running on media player 100, interface with external devices, and the like. In this example, media player 100 includes communications interface 140. Some examples of communications interface 140 can include universal serial bus (USB) interfaces, IEEE 1394 (or FireWire/iLink®) interfaces, universal asynchronous receiver/transmitters (UARTs), wired and wireless network interfaces, transceivers, and the like. Media player 100 may connect to devices, accessories, private and public communications networks (e.g., the Internet), or the like, using communications interface 140.

In one example, media player 100 can be coupled via a wired and/or wireless connector or port to output audio and/or other information to speakers 150. In another example, media player 100 may be coupled via a wired and/or wireless connector or port to output audio and/or other information to headphones 160. In yet another example, media player 100 may be coupled via a wired and/or wireless connector or port to interface with an accessory 170 or a host computer 180. The same connector or port may enable different connections at different times.

Media player 100 can be physically inserted into docking system 190. Media player 100 may be coupled via a wired and/or wireless connector or port to interface with docking system 190. Docking system 190 may also enable one or more accessory devices 195 to couple with wires or wirelessly to interface with media player 100. Many different types and functionalities of accessory devices 170 and 195 can interconnect to or with media player 100. For example, an accessory may allow a remote control to wirelessly control media player 100. As another example, an automobile may include a connector into which media player 100 may be inserted such that an automobile media system can interact with media player 100, thereby allowing media content stored on media player 100 to be played within the automobile.

In various embodiments, media player 100 can receive content or other media assets from a computer system (e.g., host computer 160). The computer system may serve to enable a user to manage media assets stored on the computer system and/or stored on media player 100. As an example, communications interface 140 may allow media player 100 to interface with host computer 160. Host computer 160 may execute a media management application to manage media assets, such as loading songs, movies, photos, or the like, onto media player 100. The media management application may also create playlists, record or rip content, schedule content for playback or recording, or the like. One example of a media management application can be iTunes®, produced by Apple, Inc. of Cupertino, Calif.

In some embodiments, media player 100 can receive content or other media assets from a variety of sources, such as over the air radio or television (TV), satellite radio or TV, cable TV or music services, Internet streaming broadcasts, podcasts, satellite broadcasts, fiber optic distribution, or the like. Content or other media assets may be transmitted in analog, digital and/or hybrid forms. Content or other media assets may be transmitted in a content stream. A content stream may be a serialization or sequence of content. The content stream may be distributed in real time, such as a broadcast, or in non-real time, such as a network stream or podcast. As used herein, a "broadcast" can refer generally to real time distribution of content (e.g., audio and/or visual data, etc.) or other media assets via a wired or wireless medium to an arbitrary number of receivers that may be tuned in to receive it. In general, a receiver does not control when a broadcast begins or ends, although some receivers (e.g., audio or video recorders) may be able to store content streams for later presentation to a user.

Figure 2:
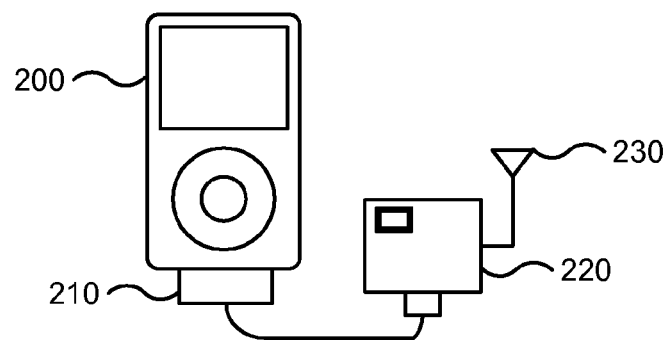
FIG. 2 is a block diagram of a first media player configured to receive content streams in one embodiment according to the present invention.

FIG. 2 is a block diagram of media player 200 configured to receive content streams in one embodiment according to the present invention. Media player 200 may be embodied as media player 100 of FIG. 1. Media player 200 can be coupled via accessory 210 to receiver unit 220. Receiver unit 200 may be capable of receiving content streams from one or more sources (not shown) using antenna 230.

The content streams from the one or more sources can include content as well as metadata identifying the content (e.g., track title, album, artist, type, rating, bit-rate, encoding, location, or store/product) and/or the source of the content (e.g., broadcaster, station frequency, station name, or station identification). Receiver unit 220 can capture content and metadata (and/or a portion thereof) and may provide the content and metadata (and/or the portion thereof) to media player 200, either in response to a user command or automatically.

Receiver unit 220 can be used to receive content from the one or more sources via one or more media. In general, any medium or combination of media can be supported. In this example, receiver unit 220 can connect to antenna 230, which can be capable of detecting broadcasts of content from the one or more sources via a wireless medium (e.g., FM or AM radio in standard and/or HD formats, over the air TV, satellite TV or radio, WiFi, cellular communication network, etc.). Receiver unit 220 may also connect to a cable (not shown) and thus be capable of receiving broadcasts of content from the one or more sources via a wired medium (e.g., cable TV service, wired Internet connection, or the like). Receiver unit 220 may include any hardware and/or software elements usable to extract content and/or metadata from wired and/or wireless media as desired; the particular components will depend on the medium (or media) supported. Any combination or sub-combination of wired and/or wireless media can be supported.

Receiver unit 220 can deliver signals corresponding to content streams received from the one or more sources to media player 200 to deliver content or other media assets and/or metadata associated with the received content streams. Media player 200 can include appropriate decoding and processing components to extract content and/or metadata from content streams received from the one or more sources in encoded form. These components can generate analog and/or digital signals suitable for driving video and/or audio output devices, such as display devices and/or speakers. Such output devices can be integrated into media player 200, an accessory (e.g., accessory 170 of FIG. 1), or the devices can be supplied as external components coupled to the accessory or media player 200 via suitable connections.

Figure 3:
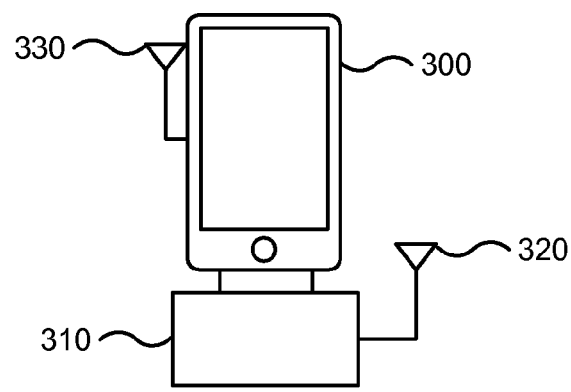
FIG. 3 is a block diagram of a second media player configured to receive content streams in one embodiment according to the present invention.

FIG. 3 is a block diagram of media player 300 configured to receive content streams in one embodiment according to the present invention. Media player 300 may be embodied as media player 100 of FIG. 1. Media player 300 can be linked to dock 310. Media player 300 may be coupled via wires or wireless using one or more connectors or ports (not shown) to interface with dock 310.

In this example, dock 310 includes antenna 320. Antenna 320 may be integrated into the housing of dock 310 or may protrude therefrom. Dock 310 can be adapted to receive content streams from various sources, including any of the sources and/or formats mentioned above. Dock 310 can be adapted to connect to a data network, e.g., via a wired or wireless connection (not explicitly shown in FIG. 3) to receive content and/or metadata associated with a content stream.

Media player 300 also can include antenna 330. Antenna 330 may be integrated into the housing of media player 300 or may protrude therefrom. Media player 300 can be adapted to receive content streams from various sources using antenna 330, including any of the sources and/or formats mentioned above.

Figure 4:
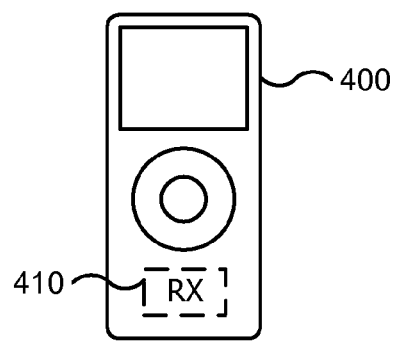
FIG. 4 is a block diagram of a third media player configured to receive content streams in one embodiment according to the present invention.

FIG. 4 is a block diagram of media player 400 configured to receive content streams in one embodiment according to the present invention. Media player 400 may be embodied as media player 100 of FIG. 1. Media player 400 can include integrated receiver 410.

Receiver 410 can be adapted to receive content from various sources, including any of the sources and/or formats mentioned above. Media player 400 can be adapted to connect to a data network, e.g., via a wired or wireless connection (not explicitly shown in FIG. 4) to receive content and/or metadata associated with a content stream.

It will be appreciated that the embodiments of media player 100 described herein are illustrative and that variations and modifications are possible. Media players and/or portable media devices, such as media player 100, may include devices capable of storing and/or playing content or other media assets. Media players and/or portable media devices may include devices capable of content stream receiving capability which may be provided by a detachable receiver accessory or by receiver components built into a device. Further, although embodiments may make specific reference to receiving content streams from one or more sources, embodiments of media player 100 can function as the source of a content stream.

Media player 100 may also provide additional capabilities (e.g., generating content streams; recording content streams; making and receiving telephone calls; managing personal information such as contacts and calendar; communicating via e mail, text messaging, instant messaging; etc.) as desired. Although FIGS. 1-4 are described herein with reference to particular blocks and modules, it is to be understood that these blocks and modules are defined for convenience of description and are not intended to imply a particular physical arrangement of component parts. Further, the blocks/modules need not correspond to physically distinct components. For instance, those skilled in the art will appreciate that different combinations of hardware and/or software components may also be used and that particular operations or features described as being implemented in software might also be implemented in hardware or vice versa.

Auto-Station Tuning

In various embodiments, a media player or portable media device can analyze information associated with multiple content streams to determine currently playing and/or forthcoming content. The media player may selectively switch between sources of the multiple content streams based on what is currently playing or in response to the occurrence of an event.

In one example, a user may configure a media player or portable media device to operate an FM radio receiver to tune to a FM radio station different from the current FM radio station when an advertisement comes on the currently tuned station. In another example, the user may configure the media player to operate the FM radio receiver to automatically select a new FM radio station or to automatically initiate playback of content stored on the media player based a user's tastes in music, a given volume level, an aversion to talk radio, or the like.

Accordingly, the media player may automatically identify on which source and automatically tune to the source of music, television programs, and other content or media assets in which a user may be implicitly or expressly interested. The user may define preferences or other criteria that instruct the media player to create an on-the-fly playlist of content in which the user is interested that comes from the multiple content streams. The media player may automatically switch between the sources of the multiple content streams to output the content according to the playlist.

Figure 5:
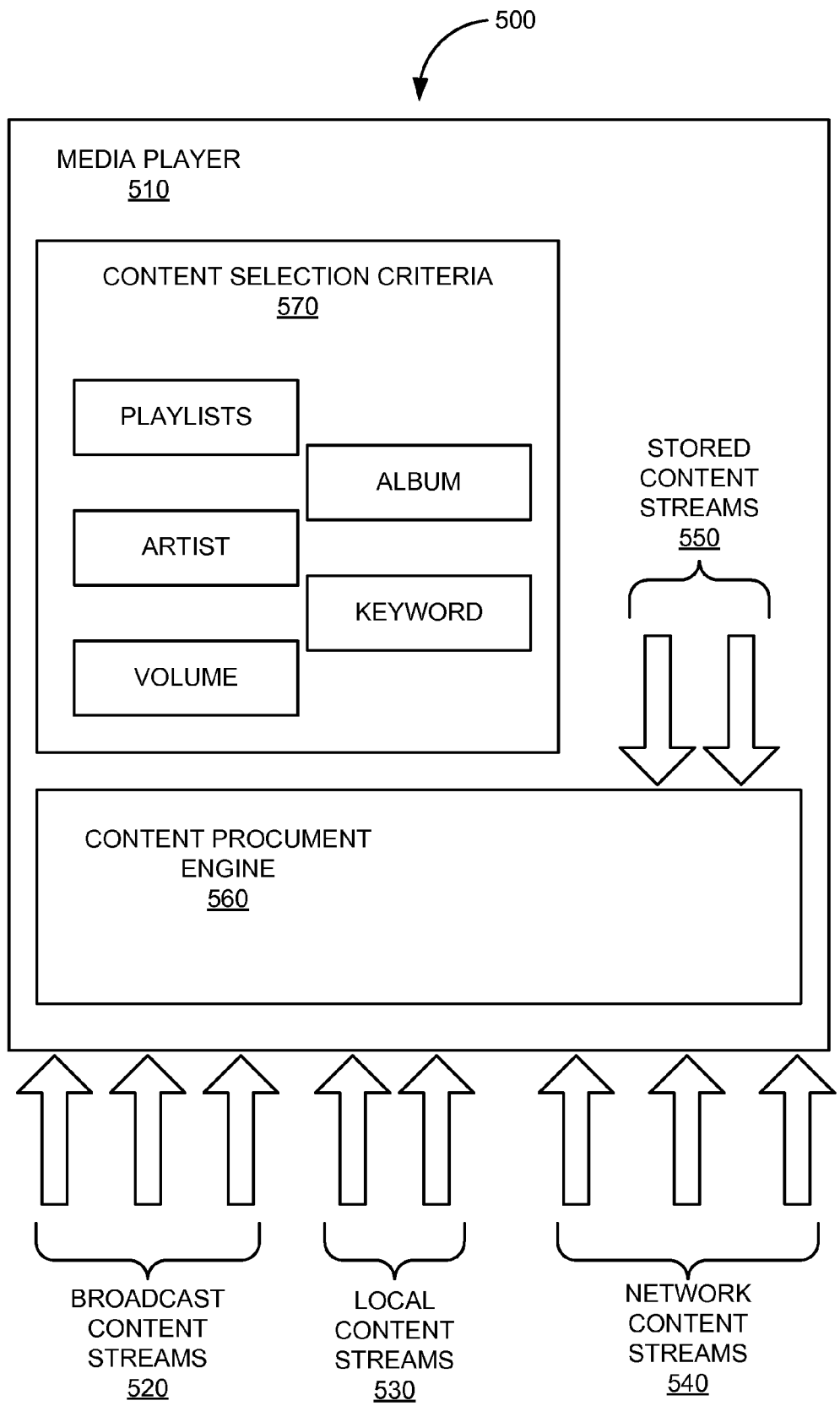
FIG. 5 is a block diagram of a media player for selectively switching between sources of various content streams in one embodiment according to the present invention.

FIG. 5 is a block diagram of media player 500 for selectively switching between sources of various content streams in one embodiment according to the present invention. Media player 500 may be embodied as media player 100, and may include some or all of the components and/or functionalities discussed above. In this example, media player 500 can receive various content streams from a variety of sources, such as broadcast content streams 520, local content streams 530, network content streams 540, and stored content streams 550. Media player 500 can include content procurement engine 560 which may procure content based on content selection criteria 570 (e.g., playlist, artist, album, keyword, volume, etc.).

Media player 500 may receive broadcast content streams 520 from various sources (such as AM, FM, TV, HD, or satellite sources), including any of the sources and/or formats mentioned above. Media player 500 may receive local content streams 530 from various sources (such as low-power AM, FM, or TV sources), including any of the sources and/or formats mentioned above. Local content streams 530 may be created or generated by media player 500 or accessories or devices coupled via a wired or wireless connector or port to media player 500.

Network content streams 540 may be delivered to media player 500 via wired or wireless communications networks (e.g., the Internet). Media player 500 can be adapted to connect to a data network, e.g., via a wired or wireless connection (not explicitly shown in FIG. 5) to receive content and/or metadata associated with a content stream. Media player 500 may receive network content streams 540 from various sources (such as media distribution servers, websites, or P2P hosts), including any of the sources and/or formats mentioned above.

Media player 500 may receive stored content streams 550 in any of the formats mentioned above. Media player 500 can be adapted to create or generate a content stream from content or other media assets stored on media player 500 to receive content and/or metadata associated with a content stream. Media player 500 may generate a content stream from one or more songs, TV programs, videos, audio books, images, photos, or the like.

Content selection engine 560 can include hardware and/or software elements usable to determine whether content within a content stream satisfies or otherwise matches one or more criteria. Content procurement engine 560 may select content for playback from content streams 520, 530, 540, and/or 550 in response to content selection criteria 570. Content selection criteria 560 can include any set of criteria, rules, conditions, attributes, preferences, or the like. Content selection criteria 570 may specify or define metadata, tags, or attributes associated with content, such as title, artists, album, genre, category, rating, rank, bit-rate, type, keyword, or the like. A user may input, upload, or otherwise store information as content selection criteria 570 on media player 500. Content selection criteria 570 may form part of a user profile or user preference setting.

In one example of operation, media player 500 may switch between content streams or sources of content streams, such as content streams 520, 530, 540, and 550 to output content that satisfies one or more content selection criteria 570. For example, media player 500 may instruct or otherwise operate an NTSC or ATSC tuner to tune to a frequency or station associated with one or more of broadcast streams 520 determined by content procurement engine 560 to be playing or otherwise containing content that satisfies content selection criteria 570. Media player 500 may generate an instruction to or otherwise control an FM radio receiver to tune to a frequency or station provided by a low-power FM transmitter associated with one or more of local content streams 530 that is transmitting content that matches one or more content selection criteria 570. Media player 500 may utilize a communications interface to connect to a URL for a podcast associated with one or more of network content streams 540 to output the podcast determined to meet one or more of content selection criteria 570. Media player 500 may query a local content database to initiate playback of content stored on media player (e.g., stored content streams 550) that is of interest based on content selection criteria 570.

In various embodiments, the selective switching between sources may be performed by media player 500 without direct user intervention to select the source. Media player 500 may determine which source is going to play content of interest to the user, and automatically tune to or select the source for output of the content to the user.

Figure 6:
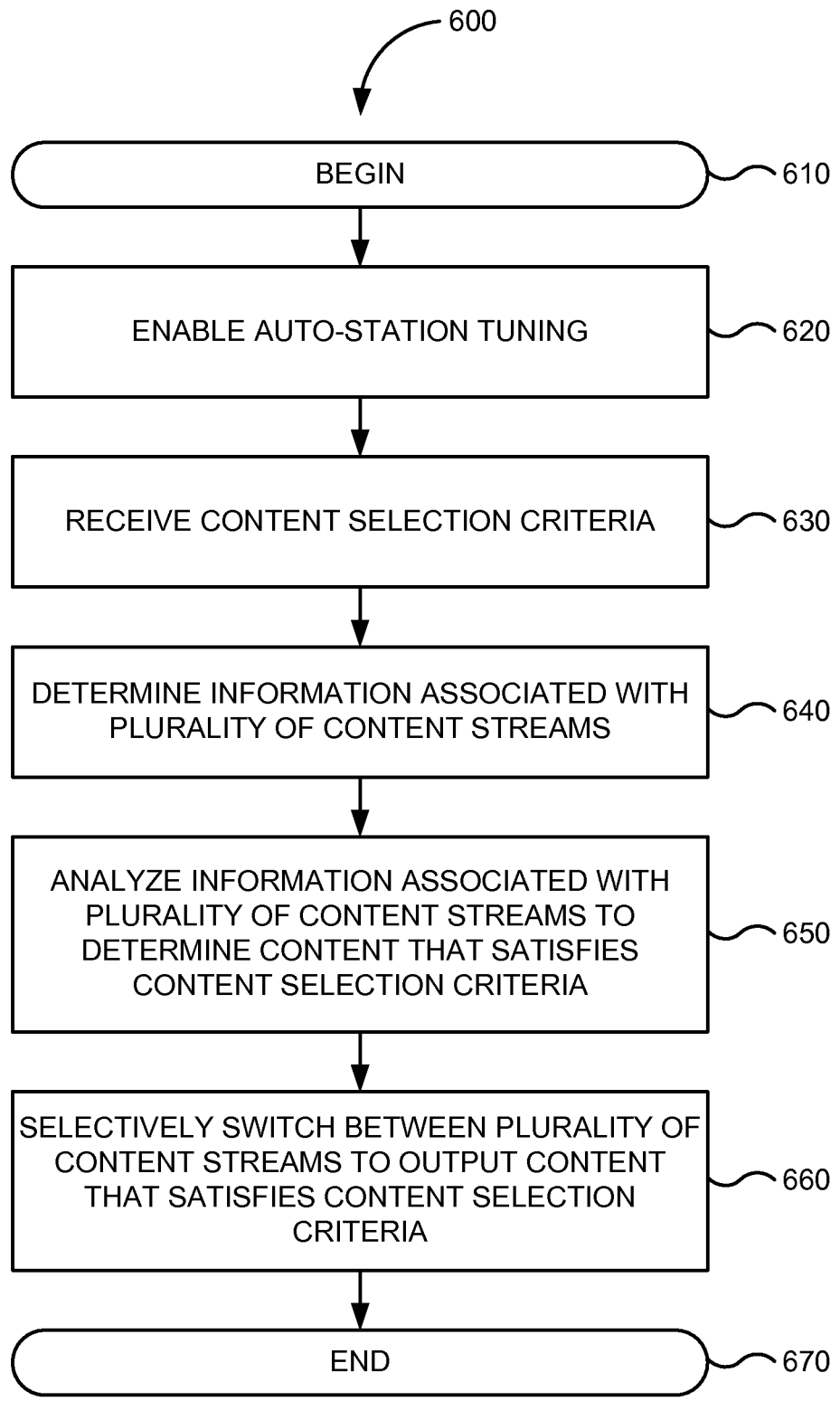
FIG. 6 is a flowchart of a method for selectively switching between sources of various content streams in one embodiment according to the present invention.

FIG. 6 is a flowchart of method 600 for selectively switching between sources of various content streams in one embodiment according to the present invention. The processing depicted in FIG. 6 may be performed by software modules (e.g., instructions or code) executed by a processor of media player 500, by hardware modules of media player 500, or combinations thereof. FIG. 6 begins in step 610.

In step 620, auto-station tuning is enabled. For example, a user may select one or more items or objects associated with an auto-station tuning mode from a graphical user interface of media player 500. In another example, a user may include a default setting in the preferences of the user such that auto-station tuning is automatically enabled at device startup, when selecting a predetermined feature or application, or the like.

In step 630, content selection criteria is received. In one example, after enabling auto-station tuning from a GUI menu, a user may input one or more content selection criteria. The user may input types of content; which albums, artists, genre, or the like; visual or acoustical preferences; which content streams, which frequencies or stations, or the like; that the user may want media player 500 to find. The content selection criteria may be saved on media player 500 for subsequent manual or automatic retrieval.

In step 640, information associated with a plurality of content streams is determined. In various embodiments, media player 500 can determine metadata that may be carried along with or independent of content streams. The metadata may include broadcast information, such as station identification, song title and other information, or the like. In some embodiments, media player 500 may apply one or more signal processing routings or filters or the like to determine information associated with visual, acoustical, or other aspects of content from the plurality of content streams.

In step 650, the information is analyzed to determine content from the plurality of content streams that satisfies the content selection criteria. For example, metadata broadcast from multiple radio stations may be analyzed to determine whether the currently playing songs or any upcoming songs that may be broadcast from the radio stations match or otherwise satisfy the content selection criteria. Media player 500 may analyze the information to identify songs with titles, albums, artists, genres, etc. that match content to which the user wants to listen. In another example, TV programming listings may be analyzed to determine whether the currently broadcast programs or any upcoming programs that may be broadcast from local, cable, satellite, and/or Internet-base stations match or otherwise satisfy the content selection criteria.

In some embodiments, the analysis of the information may include analysis of the content itself. For example, content may be analyzed to determine one or more attributes associated with the content, such as audio or visual levels, encoding, audio data, image data, close captioning, secondary audio/video feeds, protection and/or security mechanisms, or the like. In some embodiments, the content selection criteria may indicate that the user does not want to listen to any advertisement. Media player 500 may determine that an advertisement is playing if song information is unavailable or absent at a given moment in time in the content stream. Media player 500 may determine that an advertisement is playing if one or more levels (e.g., volume, color, hue, saturation) satisfies or exceeds a predetermined threshold or limit.

In step 660, content that satisfies the content selection criteria is output by selectively switching between the plurality of content streams. For example, media player 500 may automatically tune from one FM radio station that is finishing a broadcast of a song that the user wants to hear and which is also about to play a song that a user does not wish to hear to another FM radio station currently or about to play content that satisfies the content selection criteria. Media player 500 may selectively switch between one or more of FM radio stations, satellite radio stations, TV stations, analog or digital cable feeds, HD radio and television, and local and network content streams.

In one example, media player 500 may continuously output content broadcast from a given FM radio station, except during advertisements or breaks. Media player 500 may automatically switch to another FM radio station, switch to another broadcast source (e.g., TV, cable, or satellite), switch to receiving a content stream via a communications network, or switch to content or other media assets stored on media player 500 until non-advertisement content is again received from the given FM radio station. Accordingly, media player 500 may automatically tune to different sources to find content that matches the user's preferences and to prevent exposing the user to content not of interest to the user. FIG. 6 ends in step 670.

In various embodiments, media player 500 may generate a playlist of content that satisfies the content selection criteria to determine when and to which content stream to switch. The playlist may contain only the currently playing content, or may further contain several items associated with content that is about to be played on the same or different content streams. Media player 500 may automatically add or delete content to the playlist subject to content and/or content stream availability. Thus, the playlist may be dynamically updated periodically in response to new or missing information from the content streams.

In various embodiments, a user may provide one or more rules, scores, weights, priorities, or additional content selection criteria that assist in the placement of items in the dynamic playlist. The rules may indicate when and where the items are placed. For example, a user may assign a high priority to content associated with a given artist. Content associated with the given artist that is currently playing or about to play on one or more of the content streams can be added to the front or top of the dynamic playlist. As discussed above, media player 500 may record or download content for later playback due to scheduling conflicts or the like.

Figure 7:
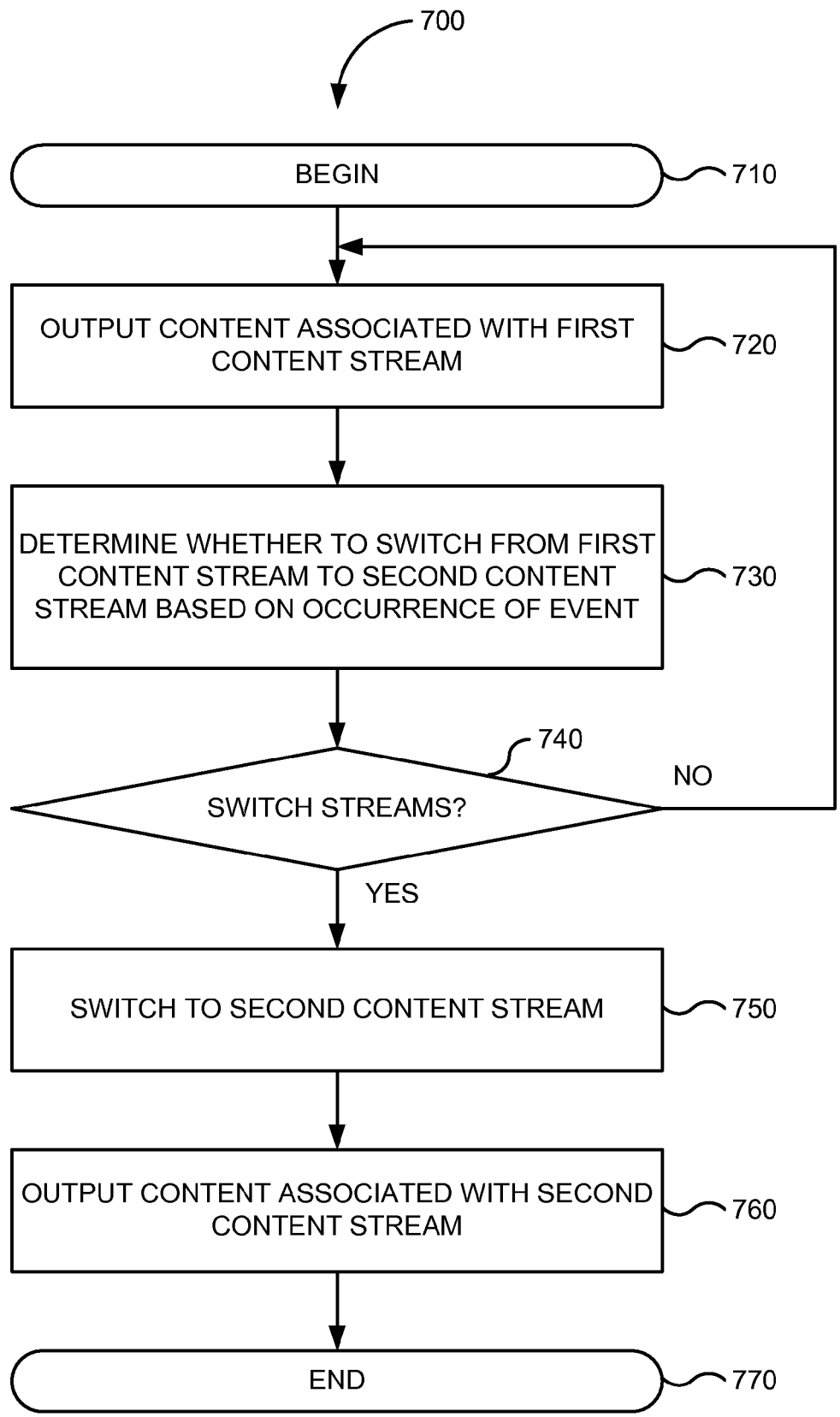
FIG. 7 is a flowchart of a method for selectively switching between sources in response to the occurrence of an event in one embodiment according to the present invention.

FIG. 7 is a flowchart of method 700 for selectively switching between sources in response to the occurrence of an event in one embodiment according to the present invention. FIG. 7 begins in step 710.

In step 720, content from a first content stream (e.g., radio station, TV station, movie, etc.) is output. In step 730, a determination is made whether to switch from the first content stream to a second content stream based on the occurrence of an event. An event can include an occurrence, a happening, a set of circumstances, a trigger, an action, or the like.

In various embodiments, the ending of a first portion of content and the beginning of a second portion of content identified in a playlist may raise an event. In another example, one or more triggers, timers, alarms, or reminders may raise an event. The user may schedule media player 500 to switch between radio stations, TV shows, music videos, etc. at a predetermined time. In yet another example, an event may be raised in response to the user receiving an electronic message, such as an e-mail, instant message, SMS message, or the like. An event may be raised in response to activation of a hyperlink associated with a web page or other electronic document.

If a determination is made in step 740 not to switch streams, the process continues in step 720 where content is output from the first content stream. In some embodiments, an event may be raised, but the stream may not be switched because the first content stream may be given a higher priority than the priority associated with the event.

If a determination is made in step 740 to switch streams, in step 750, a switch is performed to a second stream. For example, media player 500 may switch from one FM or satellite frequency to another, from one TV station to another, from a radio station to a TV station, from a broadcast content stream to a local or network content stream, or the like. The second stream may be selected based on a random determination, based on information associated with the event, based on a playlist, based on input specified by the user, based on all available content streams, or the like. In step 760, content associated with the second content stream is output. FIG. 7 ends in step 770.

Accordingly, in various embodiments, media player 500 automatically provide a user with the playback of content that the user desires from multiple sources. Media player 500 can identify which of the forthcoming content that the user wishes to receive from multiple sources and may selectively switch from one source to another based on the user's tastes, preferences, or in response to other events. In various embodiments, a given station, program, song, or other media asset from different sources can be identified and automatically added to a playlist based a user's criteria to drive from which source and when playback of the selected content occurs.

Radio Style Tuning

In various embodiments, a user can interact with a media player or portable media device to browse or otherwise initiate playback of content or other media assets as if the user were "tuning" a radio or television dial. Consider an example of an FM radio receiver. The FM radio receiver may allow a user to choose radio frequencies within a defined FM radio spectrum. In various markets, frequencies within the defined FM radio spectrum may be licensed to different radio stations. Often, each radio station can represent a different category, flavor, or type of audio content, such as rock, classical, easy listening, or the like. A user may scan the different radio stations by manipulating a radio dial or selector buttons to instruct the FM radio receiver to select or change frequencies to tune to a given station; potentially pausing on the given radio station to preview the content currently being broadcast.

In various embodiments, a user may be provided with a virtual spectrum of frequencies or stations. The media player may enable the user to tune to different stations accessible within the virtual spectrum as if the user were tuning a familiar radio dial. The user may select a given station, channel, frequency, etc. within the virtual spectrum to preview the station's content. Based on whether the user focuses on a given station's content, the media player may automatically procure and obtain additional content to be output to the user that can be similar to the previewed content.

In various embodiments, a media player or portable media device may present the user with the virtual spectrum in the form of a "navigation stream." The navigation stream may include information for previewing what content is associated with a particular station, frequency, programming, channel, etc. For example, the media player may output or present excerpts or clips taken from content selected to represent each station within the virtual spectrum as the user navigates or tunes to each station within the navigation stream.

The media player may allow the user to interact with the navigation stream using "tuning" motions (e.g., circular motions made by the user with user interface) as the user attempts to find the station that contains content in which the user may be interested. The media player may determine that a given station within the navigation stream is the subject of the user's focus when the user stops tuning motions and pauses on a particular excerpt or clip representing the given station. In response to this content-based focus, the media player may determine what actions may be performed or what content may be played back.

Figure 8:
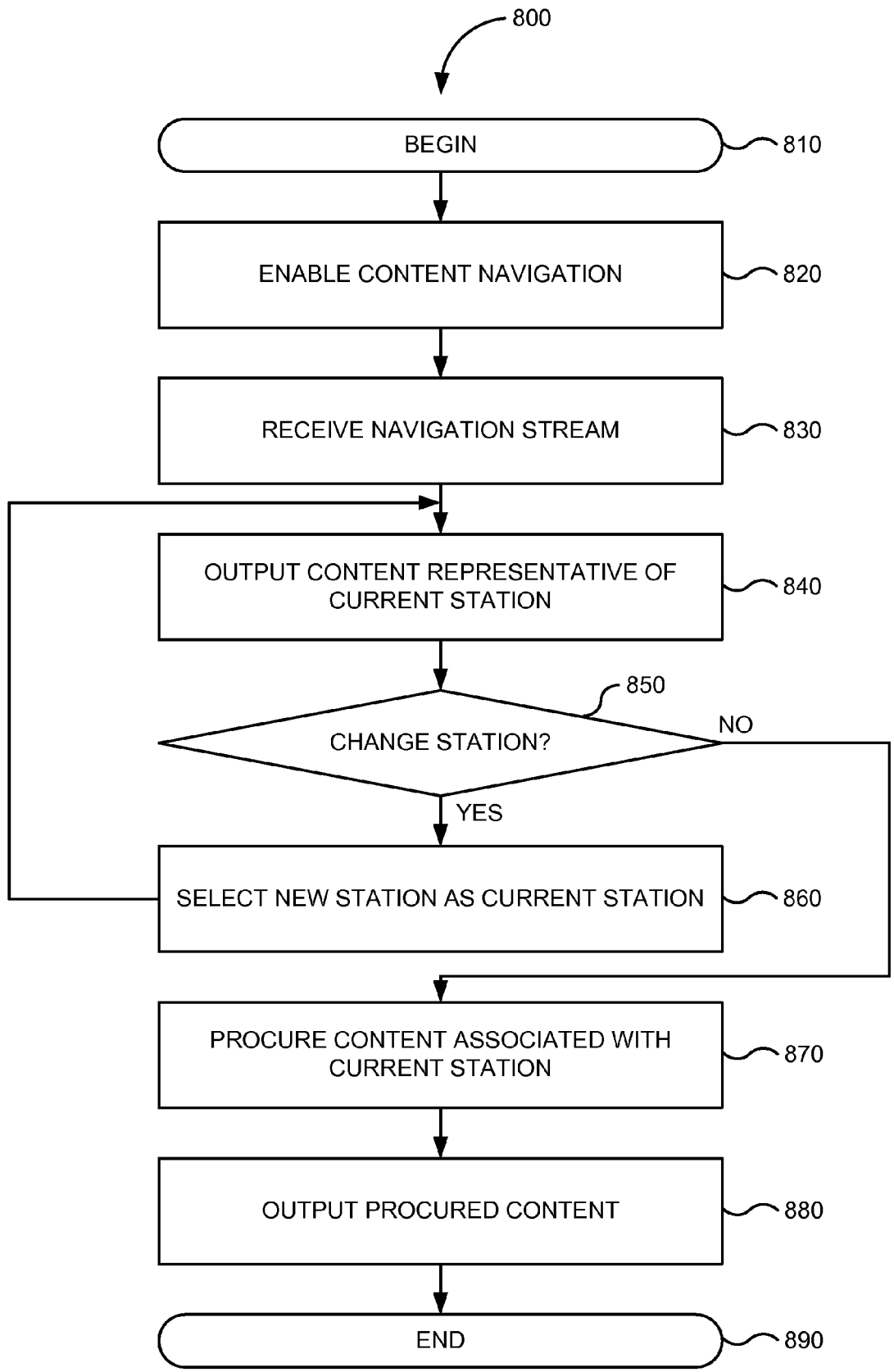
FIG. 8 is a flowchart of a method for browsing content using a navigation stream in one embodiment according to the present invention.

FIG. 8 is a flowchart of method 800 for browsing content using a navigation stream in one embodiment according to the present invention. FIG. 8 begins in step 810.

In step 820, content navigation is enabled. For example, a user of media player 500 of FIG. 5 may selection a menu option associated with a graphical user interface that enables radio station style tuning to discover and initiate playback of content stored in media player 500. In another example, media player 500 may automatically enter a mode associated with content navigation in response to a user downloading a navigation stream from the Internet. In still yet another example, content navigation may be enabled in response to a user initiating or performing a predetermined motion or gesture.

In step 830, a navigation stream is received. A navigation stream can include real-time content streams, non-real time content streams, serialized content streams, aggregated content, or the like. For example, a navigation stream may include a plurality of excerpts, samples, or clips taken from content. In one embodiment, each excerpt or clip may be one or more seconds worth of content. For example, a clip may be 4 to 8 seconds of audio. Each individual excerpt, sample, or clip may represent a station (such as a radio or television station), frequency, programming, channel, etc. assessable via the navigation stream. Each station can also represent a potentially different set, type, style, genre, etc. of content within the navigation stream.

In some embodiments, the content from which the excerpts, samples, or clips may be taken can be stored locally on media player 500, received via a wireless medium (e.g., FM or AM radio in standard and/or HD formats, over the air TV, satellite TV or radio, WiFi, cellular communication network, etc.), or received via a wired medium (e.g., cable TV service, wired Internet connection, or the like). Any combination or sub-combination of locally stored content or content received via wired and/or wireless media can be supported. Accordingly, a navigation stream may be generated by media player 500; and may be created from content stored on media player 500 or may be generated from content received via wireless or wired media. A navigation stream may also be generated by one or more other sources, using any of the sources or formats discussed above.

In step 840, information representative of the current station is output. The information representative of the current station may include metadata or content itself. In one example, the information can include an excerpt, sample, or clip that was taken from content. In another example, the information can include metadata, such as tag information or broadcast information. The information may be output audibly or visually, or using one or more other sensory mechanisms, such as touch, or the like.

In various embodiments, the information can include the given excerpt, sample, portion, or clip of the content which may be currently received by media player 500. In one example, the information may include the first clip that media player 500 receives when a navigation stream is first received. In some embodiments, the information can include an excerpt, sample, portion, or clip of the content on which the user has focused or applied a focus using a user interface.

In step 850, a determination is made whether to change the station. In various embodiments, the determination can be made based on a user's interactions with a user interface. For example, media player 500 may determine to navigate to the next station (e.g., skip, advance, or otherwise navigate to the next or subsequent excerpt or clip) within the navigation stream in response to the user clicking forward/reverse or fast forward/rewind buttons associated with media player 500. In another example, the determination may be made in response to continuous interactions (e.g., continuous circular motions) of the user with the user interface.

Figure 9:
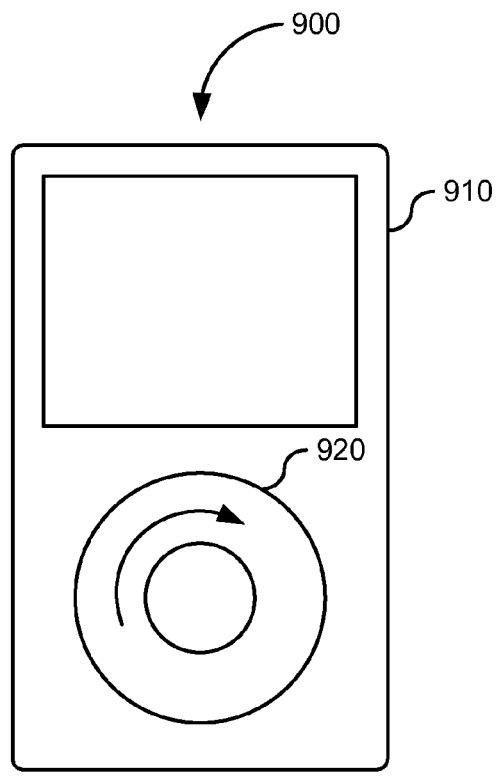
FIG. 9 illustrates one mechanism for navigating stations within navigation streams using a media player in one embodiment according to the present invention.

FIG. 9 illustrates one mechanism for navigating stations within navigation streams using media player 900 in one embodiment according to the present invention. In this example, media player 900 may include a housing 910 with a wheel interface 920. In response to circular (or angular) motions of a user with wheel interface 920, media player 900 may determine to navigate to a different station within one or more content streams. For example, in response to forward motions (as indicated by the clockwise arrow), media player 900 can advance to new stations within the one or more content streams. Reverse motions (e.g., counter-clockwise) can return the user to a previously listened to or past station.

Media player 900 may determine the rate at which to change stations based on the speed (e.g., how fast or slow) at which the user provides the circular, angular, or rotational motions. In one embodiment, the user may initiate circular motions and subsequently may pause the circular motions without releasing from wheel interface 920. Media player 900 may then change stations at a fixed or predetermined rate, or a rate that may be determined based on the speed of the previous user motions.

Figure 10:
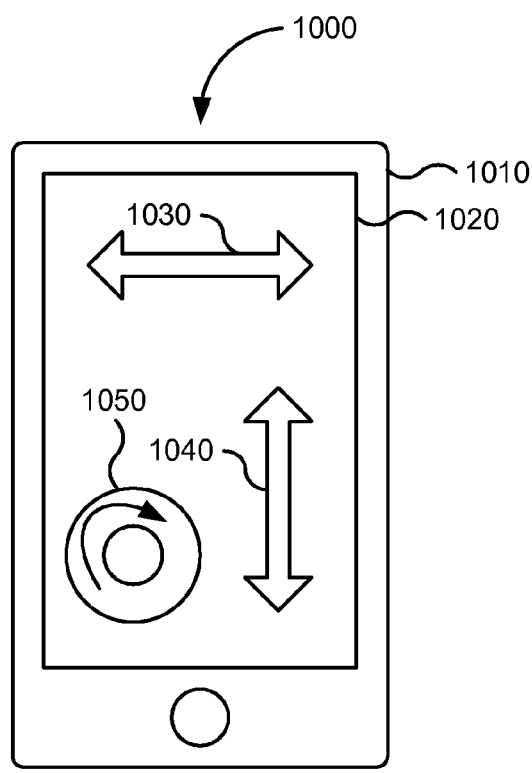
FIG. 10 illustrates other mechanisms for navigating stations within navigation streams using a media player in one embodiment according to the present invention.

FIG. 10 illustrates other mechanisms for navigating stations within navigation streams using media player 1000 in one embodiment according to the present invention. In this example, media player 1000 may include a housing 1010 with a touch screen 1020. Touch screen 1020 can provide a user with a display combined with a user interface for interacting by touch with the display. In one example, in response to scrolling or linear motions along a first line (as indicated by horizontal arrow 1030) and/or a second line (as indicated by vertical arrow 1040), media player 1000 may determine to switch between stations associated with one or more content streams. Media player 1000 may determine when to switch to a different station in response to the rate at which a user performs the scrolling or linear motions. In another example, touch screen 1020 can display image 1050 that may be a representation of a radio dial. Media player 1000 may determine to switch from a first station to a second station in response to the user's interactions with image 1050 displayed on touch screen 1020.

In various embodiments, a user may tune to different stations within a navigation stream until finding a song, video, or other media asset in which the user is interested. Returning to FIG. 8, if the determination in step 850 is made to change the station, in step 860, a new station is selected as the current station. The new station may include any station within the content stream. In one example, media player 500 may select a station within the navigation stream at random or the next sequentially ordered station as the current station. In some embodiments, a navigation stream may include an index or pointer to stations (or the beginning of each clip) within the navigation stream. Media player 500 may maintain an index or pointer associated with the current station, and can change the index or pointer to point to the index or pointer of the new station (or the beginning of the next clip or a different clip). The process continues in step 840, where information representative of the current station (i.e., the new station) is output.

If the determination in step 850 is made to not change the station, in step 870, content associated with the current station is determined. In various embodiments, the determination not to change the station may be affirmative after passage of a predetermined interval, threshold, or limit. The determination may be affirmative during which the user or media player 500 fails to initiate any action (e.g., an action to change the current station). In some embodiments, the determination may be made in response to the user selecting or clicking the play button associated with media player 500.

In some embodiments, media player 500 can determine content from the excerpt, sample, or clip representing the current station. Media player 500 may determine from what song, movie, image, etc. the excerpt or clip was taken. Media player 500 can seek through or otherwise query a content database or library to determine other content that may share a relationship with or have the identical or similar album, artist, genera, etc., as the excerpt or clip or content currently in focus. Accordingly, media player 500 may obtain a hint or cue to what content should be output to the user based on what content the user places the focus of the user's interaction within the navigation stream.

Media player 500 may automatically synchronize playback of the content from which the excerpt or clip was taken to commence during playback of the clip or after playback of the clip. Media player 500 may synchronize output of content from the beginning of the content or from one or more locations within the content. For example, media player 500 may cancel playback of the clip, and initiate playback of the content from which the clip was taken from one or more starting points, such as the beginning of the content or the beginning of a chapter, title, section, or the like within the content.

In further embodiments, media player 500 can determine additional content to be output when the excerpt, sample, or clip representing the station or the content from which the clip was taken finishes. Media player 500 may determine content based on the information associated with the station, such as attributes of the clip (e.g., title, album, artist, genre, etc.) or other metadata associated with the content stream. Media player 500 may determine a pre-created playlist of content that may be associated with the station. In some embodiments, media player 500 can automatically generate a playlist of content to represent the current station.

In step 880, the content is output. In various embodiments, media player 500 may output audio content, video content, images, pictures, or combinations thereof. Media player 500 may output the remainder of the content from which clip representing the current station was taken, or begin playback of the content from the beginning of the content. Media player 500 may also or alternatively output content identified by a playlist associated with current station or an automatically generated playlist. FIG. 8 ends in step 890.

Accordingly, in various embodiments, media player 500 may allow the user to browse content without the need to display information to the user. When the user focuses on a particular station within a navigation stream, such as when the user stops the tuning motion and pauses on a given excerpt or clip representing the station, media player 500 may continue playback the remainder of the content or other media asset from which the except or clip was taken. Media player 500 may also perform other functions, such as automatically building a playlist of content to represent the station, based on contextual information associated with where the user is at in a user interface or UI (e.g., a graphical user interface) and how the user interacts with the UI and the navigation stream. Accordingly, media player 500 can allow a user to more easily navigate and discover content and may provide intelligent output of content and other media assets to the user in response to the user's focus and interaction with the UI.

Figure 11:
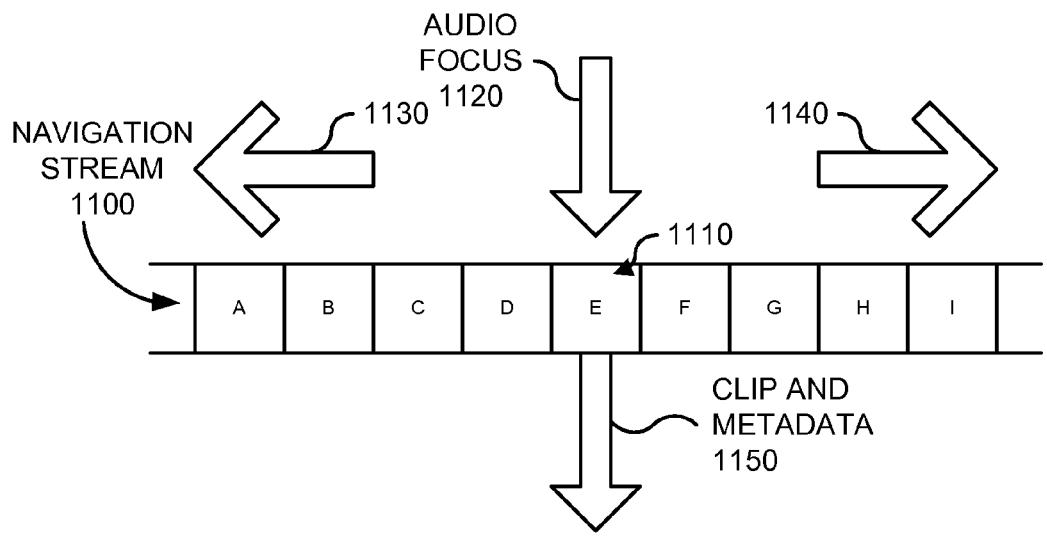
FIG. 11 is illustrates a user tuning to a station using a navigation stream in one embodiment according to the present invention.

FIG. 11 is illustrates a user tuning to a station using navigation stream 1100 in one embodiment according to the present invention. In this example, navigation stream 1100 may include a plurality of stations (e.g., station 1110) in the form of a series, sequence, or progression of samples or clips (e.g., clips A-I) taken from content or other media assets that represent each station. For example, station 1110 within navigation stream 1100 is represented by clip E. A sample or clip may be of a fixed or variable length. Additionally, navigation stream 1100 may include samples or clips of different types of content, such as combinations of audio clips, video, clips, still images or photos, or the like.

Navigation stream 1100 may be created or generated by media player 500 from content or other media assets stored on media player 500. One example of a method for locally generating a navigation stream is described further with respect to FIG. 15. Navigation stream 1100 also or alternatively be generated by one or more sources other than media player 500. Navigation stream 110 may be received at media player 500 via a wired or wireless medium, for example, from the Internet.

A user may interact with media player 500 to browse or otherwise navigate the stations within navigation stream 1100. Arrow 1120 conceptually provides an indicator to station 1110 (or clip E representing the station) where the user currently finds himself or herself when tuning for content. As indicated by arrow 1130 directed to the right and arrow 1140 directed to the left, the user can advance forward to seek for stations within navigation stream 1100 and/or reverse to seek for stations within navigation stream 1100.

In various embodiments, media player 500 can allow a user to browse navigation stream 1100 similar, for example, to tuning to frequencies or stations with a radio dial. Media player 500 may output to the user portions of the samples or clips of content associated with each station and metadata associated with each station (represented by arrow 1150) that pass within the focus of the user (represented by arrow 1120). Media player 500 may output the portions depending on how long the focus of the user remains on a particular station (e.g., station 1110). If the user browses quickly to and past each of the radio stations, for example, by turning the radio dial rapidly, a smaller portion of the samples or clips of content may be played or otherwise output in succession to simulate a user rapidly turning a radio dial. If the user browses slowly through each of the radio stations, a larger portion of the samples or clips of content may be played to the user.

Figure 12:
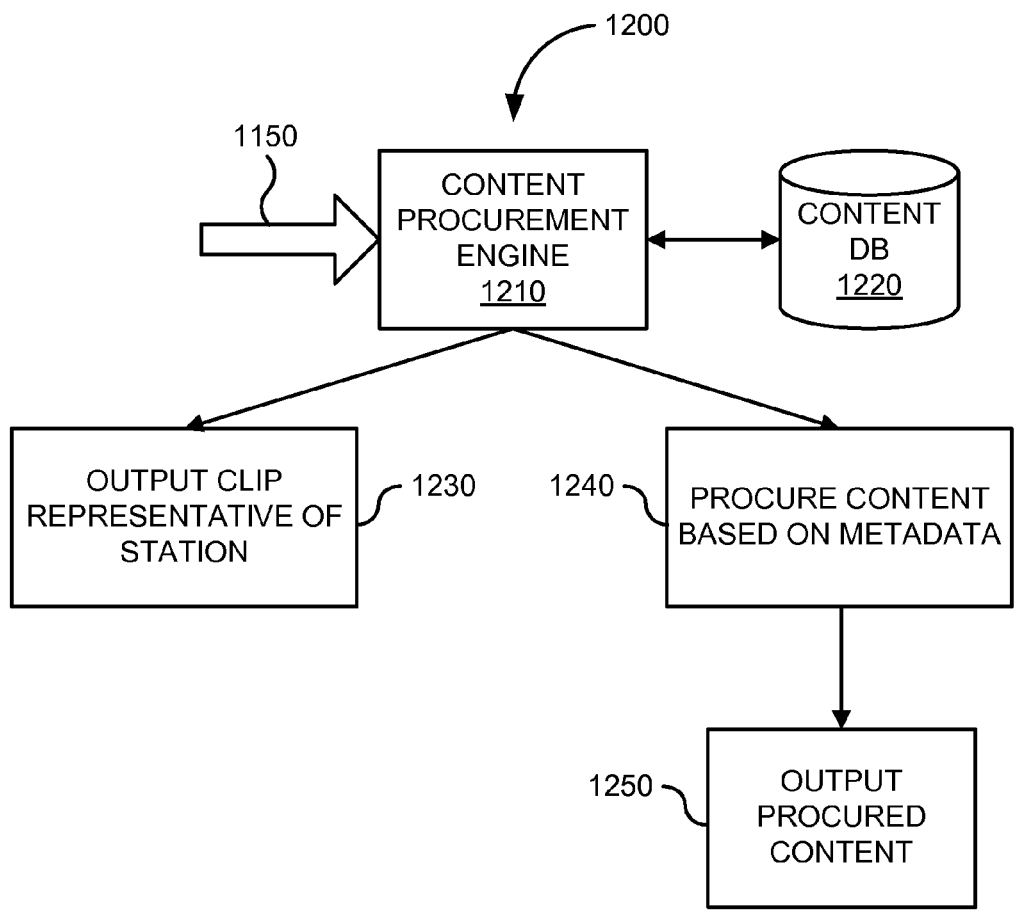
FIG. 12 is a block diagram of a content procurement system for playing content associated with a station within a navigation stream in one embodiment according to the present invention.

FIG. 12 is a block diagram of content procurement system 1200 for playing content associated with a station within a navigation stream in one embodiment according to the present invention. In this example, clip and metadata 1150 that represents station 1110 within navigation stream 1100 of FIG. 11 is received by content procurement engine 1210. For example, content procurement engine 1210 may receive an indication, during which the user is interacting with media player 500 (e.g., attempting to interact by tuning a radio dial), that points to or otherwise identifies the station the user currently finds himself or herself.

Content procurement engine 1210 can include hardware and/or software elements configured to procure content or other media assets in response to clip and metadata 1150. In various embodiments, content procurement engine 1210 interacts with content database 1220 to obtain content and/or metadata associated with content. Content database 1220 can include hardware and/or software elements that provide access to content and/or metadata. The content and/or metadata may be stored on media player 500, a centralized server, or the like. For example, content database 1200 may be a database of content or other media assets stored on a file system associated with media player 500. Content database 660 can also be a centralized content providing service accessible over one or more communications networks, such as a local area network or the Internet.

In one example of operation, upon receiving an indication of the current station tuned by the user, content procurement engine 1210 may output a clip representative of the station in block 1230. For example, if navigation stream 1100 of FIG. 11 includes audio data associated with station 1120, content procurement engine 1210 may output all or a portion of the audio data associated with station 1120. In another example, content procurement engine 1210 may interact with content database 1220 to obtain and output the clip representative of the station.

In another example of operation, upon receiving an indication that the user desires to listen to the current station (e.g., the user pauses to listen to content associated with a given station), content procurement engine 1210 may procure content based on metadata associated with the station 1240. For example, if navigation stream 1100 of FIG. 11 includes metadata associated with station 1120, content procurement engine 1210 may query content database 1220 to obtain content to represent the station. In various embodiments, content procurement engine 1210 may determine or access attributes of the station from the metadata, such as the types of songs associated with the station, types of albums, artists, genres, tags, ratings, bit-rates, or the like. In block 1250, the content procured based on the metadata is output.

Figure 13:
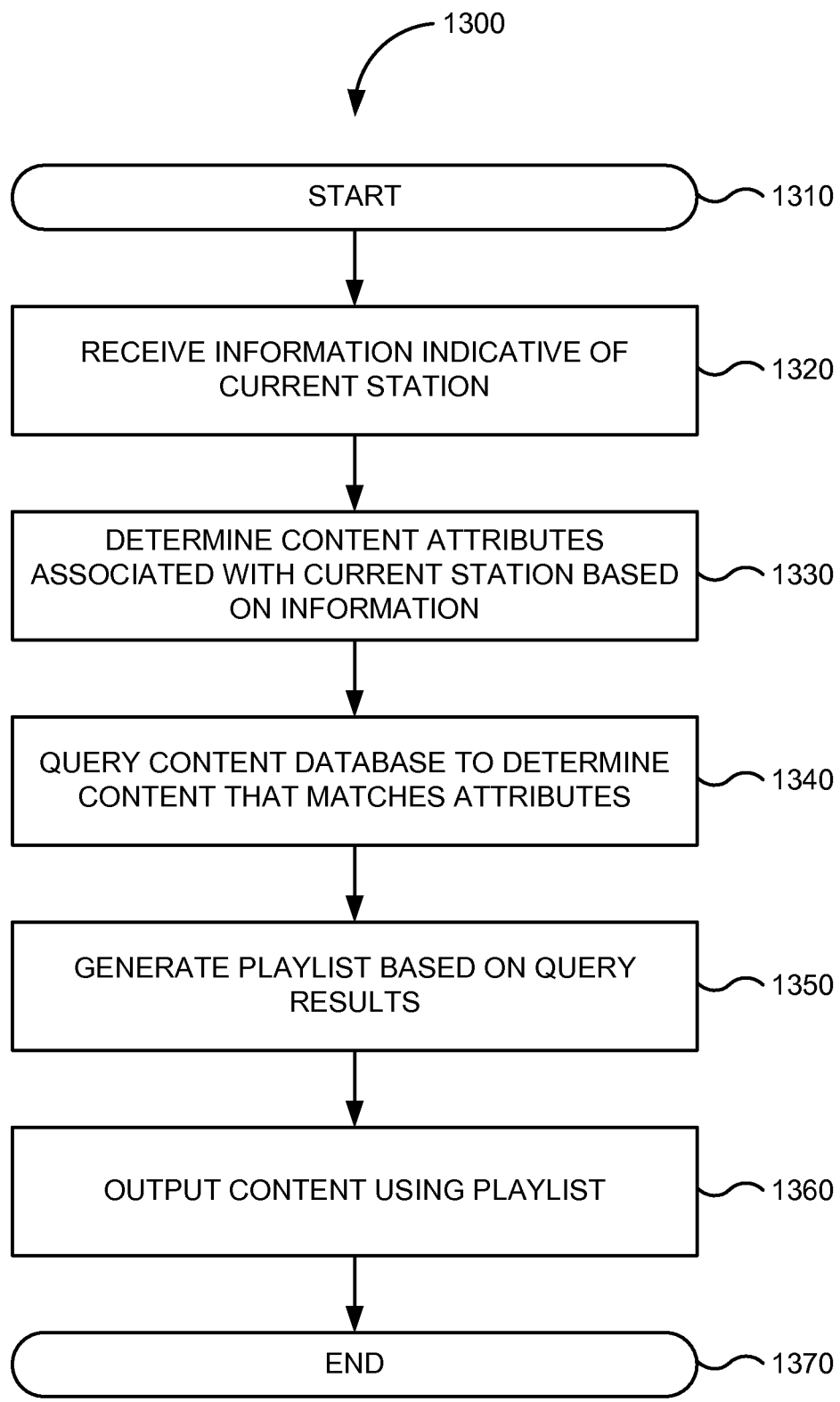
FIG. 13 is a flowchart of a method for content playback using a playlist generated from a station within a navigation stream in one embodiment according to the present invention.

In some embodiments, a playlist can be selectively build from the procured content that will then represent the station as if the user has tuned to a radio station, and listens to forthcoming content. FIG. 13 is a flowchart of method 1300 for content playback using a playlist generated from a station within a navigation stream in one embodiment according to the present invention. FIG. 13 begins in step 1310.

In step 1320, information is received indicative of a current station. The information can include an excerpt, sample, or clip taken from content or other media assets. The information can also include an index, pointer, metadata, or other station identification information. For example, the index or pointer may indicate portions of content associated with locations or stations within the navigation stream. In some embodiments, the information may be contained within the content stream. In yet other embodiments, the information may be obtained from source external to media player 500, such as a centralized content providing service accessible via a communications network.

In step 1330, content attributes associated with the current station are determined. Content attributes may include information associated with or otherwise identifying content. Some examples of content attributes are titles, albums, artists, genres, sub-genres, playlists, encoding information, formatting, container information, movie ratings, user tags, star ratings, number of plays, last time accessed, or other attributes defined by a user or content producer. The information may include information associated with a sample or clip taken from content to represent a station within the navigation stream. In some embodiments, content attributes, such as MP3 ID tag information, may be embedded into the sample or clip.

In step 1340, a content database is queried to determine content that matches the determined content attributes. For example, content procurement engine 1210 of FIG. 12 may determine that the artist associated with the clip of station 1120 is "Sting." Content procurement engine 1210 may query content database 1220 for songs or other media assets that match or otherwise have Sting as the artist. In another example, content procurement engine 1210 may determine from information associated with the clip of station 1120 that station 1120 represents '70s style classic rock. Content procurement engine 1210 may query content database 1220 for songs or other media assets that exactly match, substantially match, or are likely matches of genres associated with '70s style classic rock.

In step 1350, a playlist is generated based on the query results. In step 1360, content is output based on the playlist. FIG. 13 ends in step 1370. Accordingly, songs or other media content may be added found and output to a user based on the context or focus of the user within a navigations stream. By tuning to different station within the navigation stream and depending on where the user may be at in a user interface (e.g., on which station of a content stream is the user located), content may be added to a playlist for immediate playback or for playback after the remainder of the excerpt or clip the user selected is played. Similar content or other media assets that may be similar to the content that was the subject of the user's focus and likely to please the user can be automatically added to a playlist for subsequent playback, as if the user was listening to a radio station or the like.

Figure 14:
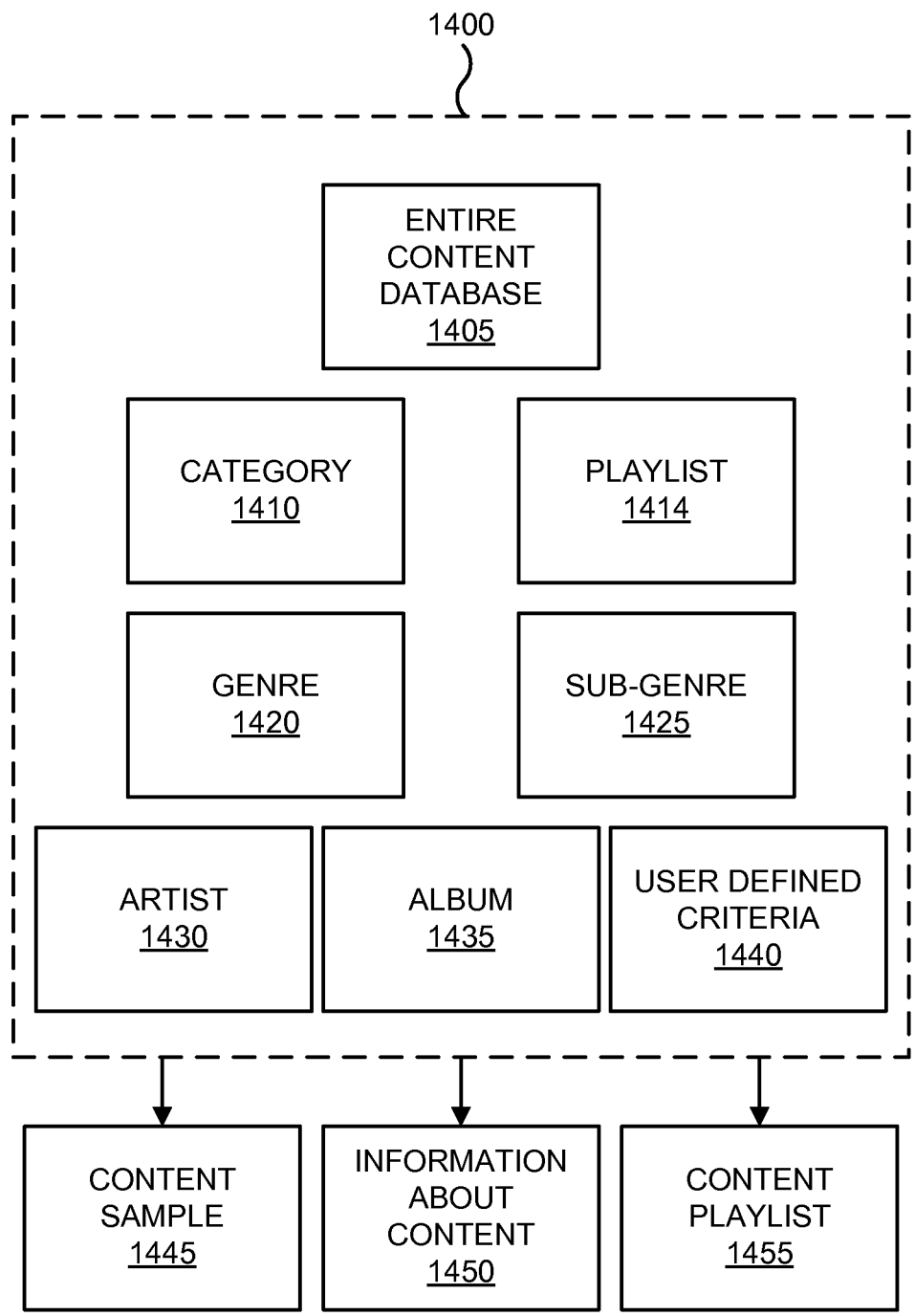
FIG. 14 is a block diagram illustrating a process flow for determining content for a station within a navigation stream in one embodiment according to the present invention.

FIG. 14 is a block diagram illustrating a process flow for determining content for a station within a navigation stream in one embodiment according to the present invention. In this example, selection criteria 1400 can be used to determine content or other media assets to be added to an on-the-fly playlist. For example selection criteria 1400 can include criterion 1405 associated with the entire content database, category criterion 1410 (e.g., a type or category of content), playlist criterion 1414 (e.g., whether content is found in a playlist, or other playlist metadata), genre criterion 1420, sub-genre criterion 1425, artist criterion 1430, album criterion 1435, or user defined criteria 1440.

In various embodiments, selection criteria 1400 can be used to determine content samples 1445. In one example, criterion 1405 associated with the entire content database is used by a content stream generator (not shown) to take excerpts or clips for all or substantially all of the content or other media assets stored in a content database or library to generate content samples 1445. For content samples 1445, a navigation stream may created having stations indicative of the entire content database or library. In another example, genre criterion 1420 can be applied to determine content samples 1445 such that each sample in content samples 1445 can be representative of a different station associated with one or more genres (e.g., Rock, Funk, Pop, Classical, etc.).

In some embodiments, selection criteria 1400 can be used to determine information 1450 about content. For example, a clip associated with a content stream may include MP3 ID tags that list the title of the content represented by the clip. Based on the title in the MP3 ID tags, selection criteria 1400 may be used to obtain missing or additional information about the content represented by the clip. In further embodiments, selection criteria 1400 can be used to generate content playlist 1455. As discussed above with respect to FIG. 13, selection criteria 1400 may be applied to generate a playlist indicative of which content to retrieve from a content database or library.

Figure 15:
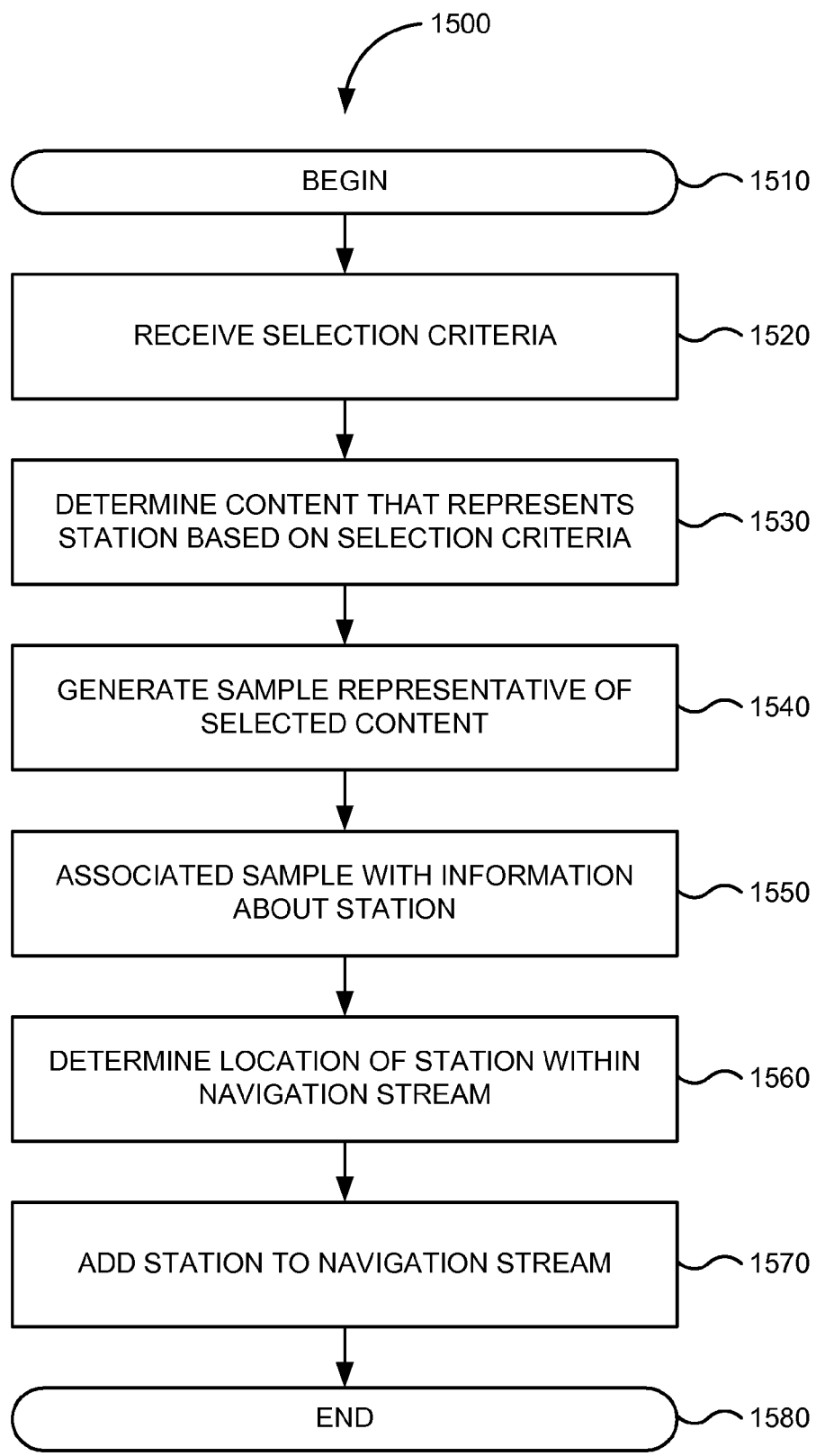
FIG. 15 is a flowchart of a method for creating a navigation stream from "stations" in one embodiment according to the present invention.

FIG. 15 is a flowchart of method 1500 for creating a navigation stream from "stations" in one embodiment according to the present invention. As discussed above, a navigation stream may be likened to the entire radio spectrum having a set of frequencies or stations on which content may be found. Each frequency or station can be represented by information, such as an excerpt, sample, or clip taken from content or other media assets. The navigation stream may include the actual clip or sample for each station and/or may include metadata about the clip or sample or content (e.g., such as what is the content, where to locate, obtain, or download the clip). FIG. 15 begins in step 1510.

In step 1520, selection criteria is received. In various embodiments, a navigation stream may be generated by a user's media player (e.g., media player 500) to allow the user to browse and discover content that is stored on the media player. The user may select or input criteria using a menu of a graphical user interface (GUI). The GUI may further prompt or request from the user one or more selection criteria, such as "Entire Library," "By Artist," "By Genre," "Custom," or the like. The user can choose one or more predefined selection criteria, or provide custom user-defined selection criteria.

In some embodiments, a navigation stream may be generated by one or more other sources different from the user's media player. Where the navigation stream originates externally to a user's media player, for example, by a content producer or media provider, the content producer or media provider may establish one or more selection criteria depending on how navigations streams are to be produced or generated.

In step 1530, content that represents a station is determined based on the selection criteria. For example, content that matches or otherwise satisfies artist information, album information, or the like within the selection criteria is determined. A single unit of content may be determined, or a set of content may be determined.

In step 1540, a sample representative of the determined content is generated. In one example, a sample can be generated from the first 5 seconds of the content. In another example, a random 4 to 8 second snippet may be taken from the content. In some embodiments, the sample may be generated by taking a snippet from the content at a location in the content that has been identified as the chorus; the most recognize refrain or scene, a face from an image or photo, a trailer, or the like.

In step 1550, the sample is associated with information about the station. For example, the sample can be associated with tag information of the content from which the sample was taken. In another example, the sample can be associated with one or more of information about artist, album, genre, or other content attributes within the selection criteria. The sample may also be associated with information that identifies the broadcaster or producer of the entire navigation stream or an individual station within a navigation stream.

In step 1560, a location of the station within the navigation stream is determined. The determined location can be at random, ordered, alphabetical, based on how much of the content represented by the sample is contained in a content library or database, based on content usage, playlist sequences, modes of the device, user specified criteria, or the like.

In step 1570, the station is added to a navigation stream. In some embodiments, the navigation steam may be a single serialized object created from each sample that represents stations within the navigation stream. The station (e.g., the clip representing the station) can be added to the serialized object. In various embodiments, a navigation stream can be a virtual object. The virtual object may provide information about stations within the navigation stream, and the location from where clips or samples representing stations may be found. FIG. 15 ends in step 1580.

Accordingly, in various embodiments, content-focused navigation and discovery of content or other media assets may be provided that allows a user to browse individual content, cover flows, lists, or other media assets. For example, a navigation stream may be generated to represent chapters and sections within an audio book. In some embodiments, as if the user were tuning a radio dial, the user can browse clips or excerpts from each chapter or section, and content associated with the audio book may be dynamically determined for playback or actions may be performed in response to the user focusing on a clip for a chapter or section within the audio book. Accordingly, a user can intuitively navigate and discover content, and receive output of content and other media assets to the user in response to the user's focus and interaction with the UI.

Figure 16:
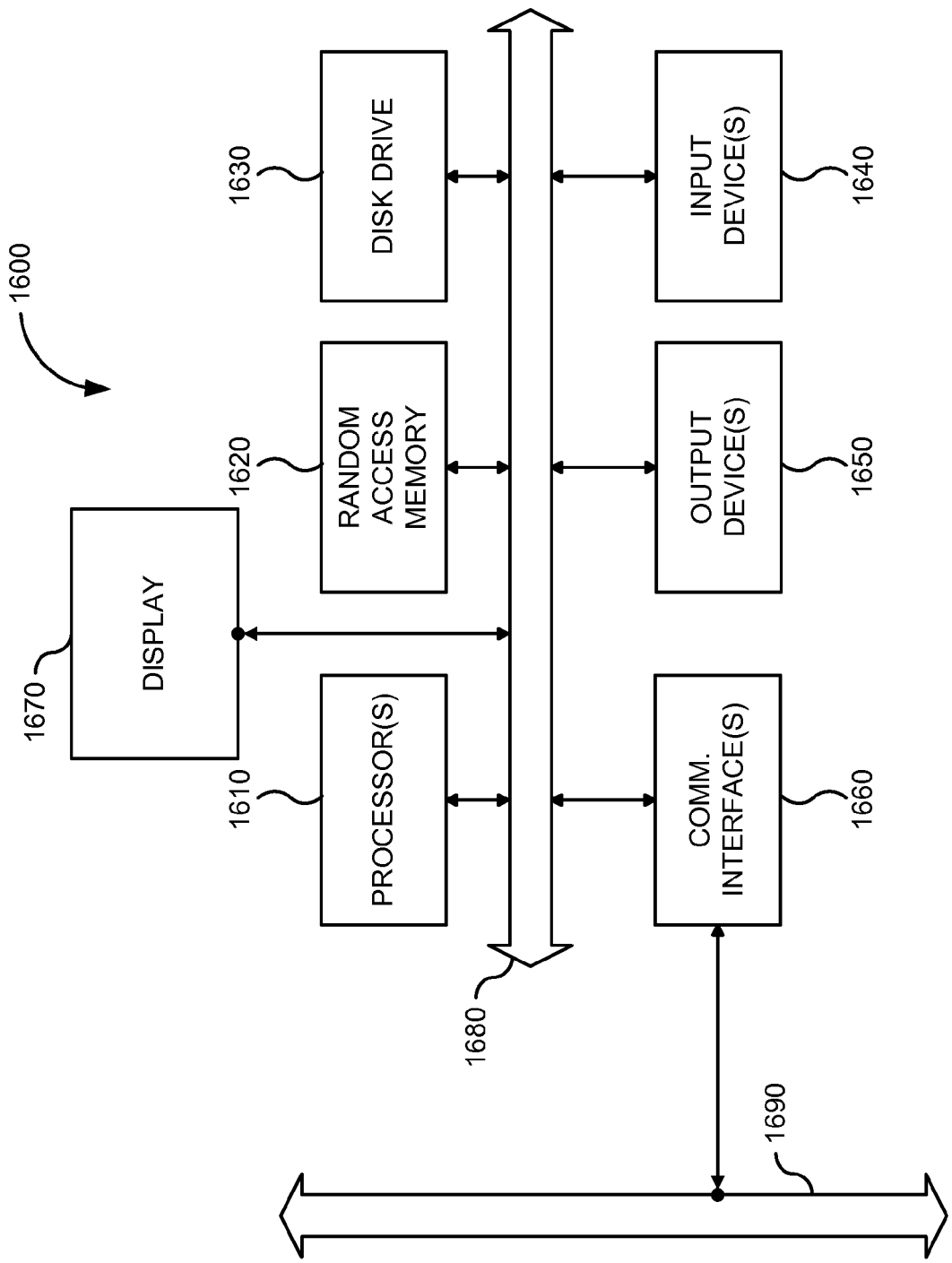
FIG. 16 is a simplified block diagram of a computer system that may incorporate embodiments of the present invention.

FIG. 16 is a simplified block diagram of a computer system 1600 that may incorporate embodiments of the present invention. FIG. 16 is merely illustrative of an embodiment incorporating the present invention and does not limit the scope of the invention as recited in the claims. One of ordinary skill in the art would recognize other variations, modifications, and alternatives.

In one embodiment, computer system 1600 includes processor(s) 1610, random access memory (RAM) 1620, disk drive 1630, input device(s) 1640, output device(s) 1650, display 1670, communications interface(s) 1660, and a system bus 1680 interconnecting the above components. Other components, such as file systems, storage disks, read only memory (ROM), cache memory, codecs, and the like may be present.

RAM 1620 and disk drive 1630 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 1640 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 1640 may allow a user to select objects, icons, text, and the like, via a command such as a click of a button or the like. In various embodiments, output device 1650 is typically embodied as a display, a printer, a force-feedback mechanism, an audio output, a video component output, and the like. Display 1660 may include a CRT display, an LCD display, a Plasma display, and the like.

Embodiments of communications interface 1670 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 1690, to a FireWire bus, or the like. In other embodiments, these computer interfaces may be physically integrated on the motherboard or system board of computer system 1600, and may be a software program, or the like.

In various embodiments, computer system 1600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 1600 may also include an operating system, such as Microsoft Windows®, Linux®, Mac OS X®, real-time operating systems (RTOSs), open source and proprietary OSs, and the like.

FIG. 16 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smart phone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for selecting content performed by a media player receiving a plurality of content streams, the method comprising:
   receiving content selection criteria;
   receiving a plurality of first items of content associated with the plurality of content streams, wherein each first item of content represents content available through a respective content stream, and wherein each first item of content satisfies the content selection criteria;
   generating, from the plurality of first items of content associated with the plurality of content streams, a navigation stream that includes the plurality of first items of content associated with the plurality of content streams;
   providing the plurality of first items of content included in the navigation stream in a temporal sequence to the media player;
   detecting an input for content that includes a selection of a first item of content; and
   in response to detecting the input for content, continuously presenting, in a content stream at the media player, a plurality of second items of content carried by the plurality of content streams, wherein each second item of content satisfies the content selection criteria.

2. The method of claim 1 further comprising analyzing information associated with the plurality of content streams by analyzing metadata associated with the plurality of content streams.

3. The method of claim 1 further comprising analyzing information associated with the plurality of content streams by analyzing content broadcast using the plurality of content streams.

4. The method of claim 1 further comprising:
   receiving an indication of the occurrence of an event; and
   in response to receiving the indication, switching content presented in the content stream from a second item of content carried a first content stream within the plurality of content streams to a different second item of content carried by a second content stream within the plurality of content streams.

5. The method of claim 1 further comprising:
   generating a playlist based on the identified items of content; and
   streaming the playlist without user intervention.

6. The method of claim 1 wherein the plurality of content streams comprises content streams from at least one of an internal source, an external source, a terrestrial radio source, a satellite radio source, a terrestrial television source, a satellite television source, or a network source.

7. The method of claim 1, wherein content the selection criteria comprises one or more of information associated with an artist, information associated with an album, information associated with a genre, information associated with a content category, information associated with a content type, information associated with a program, information associated with an audio level, information associated with a video level, or information associated with a schedule.

8. A non-transitory computer readable medium configured to store instructions which when executed by a processor of a computer system cause the process to perform operations comprising:
   receiving content selection criteria;
   receiving a plurality of first items of content associated with a plurality of content streams, wherein each first item of content represents content available through a respective content stream, and wherein each first item of content satisfies the content selection criteria;
   generating, from the plurality of first items of content associated with the plurality of content streams, a navigation stream that includes the plurality of first items of content associated with the plurality of content streams in a temporal sequence;
   detecting an input for content that includes a selection of first item of content included in the navigation stream; and
   in response to detecting the input for content, continuously presenting, in a content stream, a plurality of second items of content carried by the plurality of content streams, wherein each second item of content satisfies the content selection criteria.

9. A method comprising:
   receiving, by a media player, a plurality of content streams, wherein each of the plurality of content streams includes media items;
   receiving, by the media player, media item selection criteria;
   identifying, by the media player, a plurality of media items from the plurality of content streams, wherein the plurality of media items are representative of content carried by the plurality of content streams, and wherein each media item of the plurality of media items satisfies the media item selection criteria;
   generating, by the media player, a navigation stream including the plurality of media items identified from the plurality of content streams in a temporal sequence;
   analyzing, by the media player, the media items in the navigation stream to determine at least one media item in the navigation stream that matches the media item selection criteria;
   tuning, by the media player, without user intervention, to a first content stream, from among the plurality of content streams, that includes a media item that satisfies the media item selection criteria; and
   outputting, by the media player, the media item.

10. The method of claim 9 further comprising:
    receiving, by the media player, information about an event;
    detecting, by the media player, occurrence of the event while being tuned to the first content stream; and
    tuning, by the media player, without user intervention, to a second content stream upon occurrence of the event, wherein the second content stream is among the plurality of content streams.

11. The method of claim 10 wherein the event comprises one of: an advertisement, receiving a message, or activation of a hyperlink.

12. The method of claim 9 further comprising:
determining, by the media player, that a second media item in the first content stream does not satisfy the media item selection criteria, wherein the second media item immediately follows the at least one media item; and
in response to the determination, automatically switching, by the media player, from the first content stream to a second content stream upon completion of outputting of the media item, wherein the second content stream includes a media item that satisfies the media item selection criteria.

13. The method of claim 9 further comprising:
determining, by the media player, a plurality of media items from the plurality of content streams, wherein the plurality of media items satisfy the media item selection criteria; and
generating, by the media player, a playlist including the plurality of the media items.

14. A media player comprising:
a processor;
a storage device storing media item selection criteria; and
a communication interface coupled to the processor and the storage device, wherein the processor in conjunction with the communication interface is configured to:
receive a plurality of content streams, wherein each content stream includes one or more media items;
generate a navigation stream from the plurality of content streams, wherein the navigation stream includes multiple media item samples in a temporal sequence, each media item sample selected from and representative of content in a respective content stream, and wherein each media item sample satisfies the media item selection criteria;
detect an input for content that includes a selection of a media item sample included in the navigation stream;
in response to detecting the input for content, present, without user intervention, a plurality of media items carried by the plurality of content streams included in the navigation stream, wherein each content item satisfies the media item selection criteria.

15. The media player of claim 14 wherein, to continuously present the plurality of media items, the processor is further configured to:
present a first media item carried in a first content stream, wherein the first media item satisfies the media item selection criteria;
determine that a second media item carried in the first content stream does not satisfy the media item selection criteria, wherein the second media item immediately follows the first media item;
analyze the plurality of content streams to determine a second content stream that carries a third media item that satisfies the media item selection criteria;
automatically tune to the second content stream after the first media item is outputted; and
output the third media item.

16. The media player of claim 14 wherein the plurality of content streams comprise a radio broadcast, a television broadcast, an internet streaming broadcast, satellite radio broadcast, media stored on the storage device, or a broadcast from a local network.

17. The media player of claim 14 wherein, to continuously present the plurality of media items, the processor is further configured to:
present a first media item carried in a first content stream, wherein the first media item satisfies the media item selection criteria;
determine a second media item included in a second content stream, wherein the second media item satisfies the media item selection criteria;
automatically tune from the first content stream to the second content stream after completion of outputting of the first media item; and
output the second media item.

18. The media player of claim 14 wherein the processor is further configured to:
receive information about an event while presenting a first media item carried by a first content stream;
detect occurrence of the event; and
tune, from the first content stream to a second content stream upon occurrence of the event, wherein the second content stream includes one or more media items that satisfy the media item selection criteria.

19. The media player of claim 18 wherein the event comprises an advertisement.

20. The media player of claim 14 wherein the processor is further configured to:
determine a plurality of media items from the plurality of content streams, wherein the plurality of media items satisfy the media item selection criteria;
create a playlist including the plurality of media items; and
automatically start outputting the plurality of media items in the play list.

* * * * *